United States Patent
Van Rijen et al.

(10) Patent No.: US 12,534,583 B2
(45) Date of Patent: *Jan. 27, 2026

(54) COMPOSITIONS AND POLYMER FILMS

(71) Applicants: Fujifilm Manufacturing Europe B.V., Tilburg (NL); Fujifilm Corporation, Tokyo (JP)

(72) Inventors: Adrianus Jacobus Van Rijen, Tilburg (NL); Takeshi Narita, Tilburg (NL); Elisa Huerta Martinez, Tilburg (NL); Jacko Hessing, Tilburg (NL)

(73) Assignees: Fujifilm Manufacturing Europe B.V., Tilburg (NL); Fujifilm Corporation, Tokyo (JP)

( * ) Notice: Subject to any disclaimer, the term of this patent is extended or adjusted under 35 U.S.C. 154(b) by 398 days.

This patent is subject to a terminal disclaimer.

(21) Appl. No.: 18/041,879

(22) PCT Filed: Sep. 27, 2021

(86) PCT No.: PCT/EP2021/076438
§ 371 (c)(1),
(2) Date: Feb. 16, 2023

(87) PCT Pub. No.: WO2022/069384
PCT Pub. Date: Apr. 7, 2022

(65) Prior Publication Data
US 2024/0010804 A1    Jan. 11, 2024

(30) Foreign Application Priority Data
Sep. 30, 2020   (GB) .................................... 2015436

(51) Int. Cl.
| | | |
|---|---|---|
| *C08J 5/22* | (2006.01) | |
| *B01D 61/44* | (2006.01) | |
| *B01D 71/60* | (2006.01) | |
| *C08F 212/14* | (2006.01) | |
| *C08F 212/34* | (2006.01) | |

(52) U.S. Cl.
CPC .......... *C08J 5/2243* (2013.01); *B01D 61/445* (2013.01); *B01D 71/60* (2013.01); *C08F 212/30* (2020.02); *C08F 212/34* (2013.01); *B01D 2325/42* (2013.01); *C08J 2325/18* (2013.01)

(58) Field of Classification Search
None
See application file for complete search history.

(56) References Cited

U.S. PATENT DOCUMENTS

| | | | |
|---|---|---|---|
| 9,856,341 B2 * | 1/2018 | Lee | ................... H01M 10/0565 |
| 2016/0362526 A1 | 12/2016 | Kaminaga et al. | |
| 2023/0311071 A1 * | 10/2023 | Ripken | .............. B01D 69/1216 |
| | | | 204/296 |

FOREIGN PATENT DOCUMENTS

| | | | | |
|---|---|---|---|---|
| CN | 109096433 A | | 12/2018 | |
| CN | 110776703 A | * | 2/2020 | ............. C08L 25/18 |
| EP | 3187516 A1 | | 7/2017 | |

OTHER PUBLICATIONS

CN 110776703 A, 2020, machine translation (Year: 2020).*
Cao et al. "Electrolyte-Solvent-Modified Alternating Copolymer as a Single-Ion Solid Polymer Electrolyte for High Performance Lithium Metal Batteries" ACS Appl. Mater. Interfaces,2019, 11, 35683-35692.

* cited by examiner

*Primary Examiner* — Satya B Sastri
(74) *Attorney, Agent, or Firm* — Banner & Witcoff, Ltd.

(57) ABSTRACT

A polymer film obtainable by polymerising a composition comprising: (a) a compound Formula (I); wherein: R is $C_{1-4}$-alkyl, $NH_2$ or $C_{6-12}$-aryl; and $M^+$ is a cation; (b) a monomer comprising at least two polymerisable groups; and (c) a solvent. Also claimed are compositions and processes for making the polymer films.

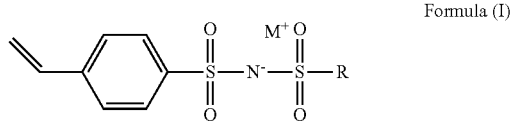

Formula (I)

17 Claims, No Drawings

COMPOSITIONS AND POLYMER FILMS

RELATED APPLICATIONS

This application is a National Stage Application under 35 U.S.C. 371 of co-pending PCT application PCT/EP2021/076438 designating the United States and filed Sep. 27, 2021; which claims the benefit of GB application number 2015436.5 and filed Sep. 30, 2020; each of which are hereby incorporated by reference in their entireties.

The present invention relates to compositions suitable for making polymer films, to polymer films, to cation exchange membranes, to bipolar membranes and to their preparation and use.

Ion exchange membranes are used in electrodialysis, reverse electrodialysis, electrolysis, diffusion dialysis and a number of other processes. Typically the transport of ions through the membranes occurs under the influence of a driving force such as an ion concentration gradient or, alternatively, an electrical potential gradient.

Ion exchange membranes are generally categorized as cation exchange membranes or anion exchange membranes, depending on their predominant charge. Cation exchange membranes comprise negatively charged groups that allow the passage of cations but reject anions, while anion exchange membranes comprise positively charged groups that allow the passage of anions but reject cations. A bipolar membrane has both a cationic layer and an anionic layer.

Some ion exchange membranes and bipolar membranes comprise a porous support which provides mechanical strength. Such membranes are often called "composite membranes" due to the presence of both an ionically-charged polymer which discriminates between oppositely charged ions and the porous support which provides mechanical strength.

Cation exchange membranes may be used for the treatment of aqueous solutions and other polar liquids, and for the generation of electricity.

Bipolar membranes may be used production of acids and bases from salt solutions e.g. for the recovery of hydrofluoric acid and nitric acid, for the separation and treatment of organic acids such as lactic acid and citric acid and for producing amino acids.

Electricity may be generated using reverse electrodialysis (RED) in which process standard ion exchange membranes or bipolar membranes may be used. Cation exchange membranes may also be used for the generation of hydrogen, e.g. in fuel cells and batteries.

Bipolar membranes can be prepared by many different methods. In U.S. Pat. Nos. 4,024,043 and 4,057,481 (both Dege et al.) single-film bipolar membranes are prepared from pre-swollen films containing a relatively large amount of an insoluble, cross-linked aromatic polymer on which highly dissociable cationic exchange groups are chemically bonded to the aromatic nuclei to a desired depth of the film from one side only; subsequently, highly dissociable anionic exchange groups are chemically bonded to the unreacted aromatic nuclei on the other side of the film.

In Japanese patent publication Nos. 78-158638 and 79-7196 (both Tokuyama Soda Co. Ltd.), bipolar membranes are prepared by partially covering a membrane with a cover film, sulphonating the surface of the membrane not in contact with the cover film to introduce cation exchange groups, exfoliating the cover film and introducing anion exchange groups on the exfoliated surface.

Bipolar membranes have also been prepared by bonding together an anion exchange film or membrane and a cation exchange film or membrane. The two monopolar membranes of opposite selectivity can be fused together with the application of heat and pressure to form a bipolar membrane. See, for example U.S. Pat. No. 3,372,101 to Kollsman wherein separate cation and anion membranes are bonded together in a hydraulic press at 150° C. at a pressure of 400 lb/sq. inch to form a two-ply bipolar membrane structure.

However, bipolar membranes formed in this way suffer the disadvantage of high electrical resistance produced by their fusion. Furthermore these membranes are prone to bubble or blister and they are operable for only short time periods at relatively low current densities.

The abovementioned disadvantages make the known bipolar membranes unattractive for commercial electrodialysis operations.

According a first aspect of the present invention there is provided a composition comprising:
(a) a compound of Formula (I);

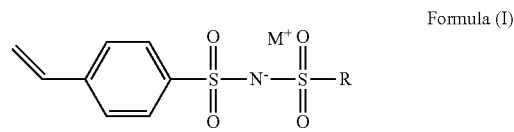

Formula (I)

wherein
R is $C_{1-4}$-alkyl, $NH_2$ or $C_{6-12}$-aryl; and
$M^+$ is a cation;
(b) a monomer comprising at least two polymerisable groups;
(c) a solvent; and
optionally (d) a radical initiator.
  Preferably the composition according to the first aspect of the present invention comprises:
  (a) 5 to 60 wt % of component (a);
  (b) 10 to 70 wt % of component (b);
  (c) 10 to 50 wt % of component (c); and
  (d) 0 to 10 wt % of component (d).

In a preferred embodiment $M^+$ is $H^+$, $Li^+$, $Na^+$, $K^+$ or of the formula $NL_4^+$ wherein each L independently is H or $C_{1-3}$ alkyl. It is particularly preferred that $M^+$ is $Li^+$, because this leads to better solubility in aqueous liquids compared to many other cations.

Compounds of Formula (I) may be obtained by methods analogous to those described in the Examples or they may be obtained commercially or by known methods.

Examples of compounds of Formula (I) which may be used as component (a) include the compounds of formula MM-A, MM-P and MM-M shown below.

Preferably the composition comprises 5 to 60 wt %, more preferably 5 to 50 wt %, most preferably 5 to 40 wt % of component (a).

Preferred polymerisable groups which may be present in component (b) include ethylenically unsaturated groups, especially (meth)acrylic groups and/or vinyl groups (e.g. vinyl ether groups, aromatic vinyl compounds, N-vinyl compounds and allyl groups).

Examples of suitable (meth)acrylic groups include acrylate ($H_2C$=$CHCO$—) groups, acrylamide ($H_2C$=$CHCONH$—) groups, methacrylate ($H_2C$=$C(CH_3)$ $CO$—) groups and methacrylamide ($H_2C$=$C(CH_3)$ $CONH$—) groups. Acrylic groups are preferred over methacrylic groups because acrylic groups are more reactive.

Preferred ethylenically unsaturated groups are free from ester groups because this can improve the stability and the pH tolerance of the resultant composition. Ethylenically unsaturated groups which are free from ester groups include vinyl groups.

As preferred examples of polymerisable groups there may be mentioned groups of the following formulae:

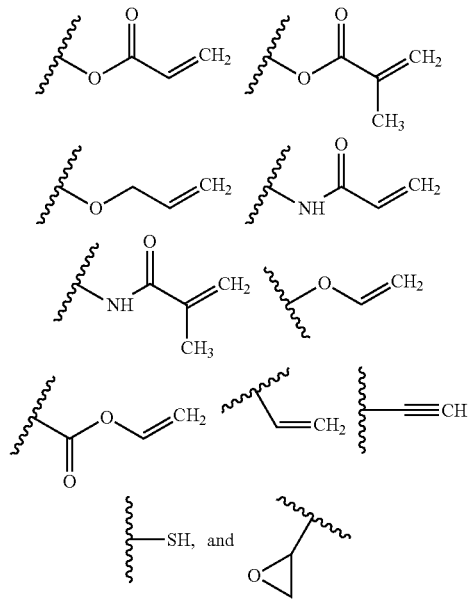

Optionally, component (b) further comprises an anionic group.

Preferably, in some embodiments, the composition comprises 10 to 70 wt %, more preferably 20 to 70 wt %, most preferably 30 to 60 wt % of component (b).

Examples of monomers comprising at least two polymerisable groups which may be used as component (b) and which further comprise an anionic group include the following compounds of Formula (MA), (C), (ACL-A), (ACL-B), (ACL-C), and/or Formula (II):

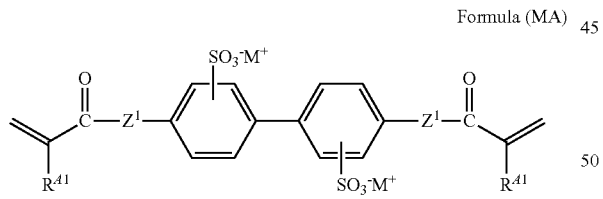

Formula (MA)

wherein in Formula (MA):
each $R^{A1}$ independently represents a hydrogen atom or an alkyl group;
each $Z^1$ independently represents —O— or —NRa—, wherein Ra represents a hydrogen atom or an alkyl group; and
each $M^+$ independently is as hereinbefore defined.

In Formula (MA), the preferences for each $M^+$ independently are as hereinbefore defined. In one embodiment each $M^+$ independently is an organic or inorganic cation, preferably $H^+$ or an alkali metal ion.

Examples of component (b) of Formula (MA) include the following and salts thereof:

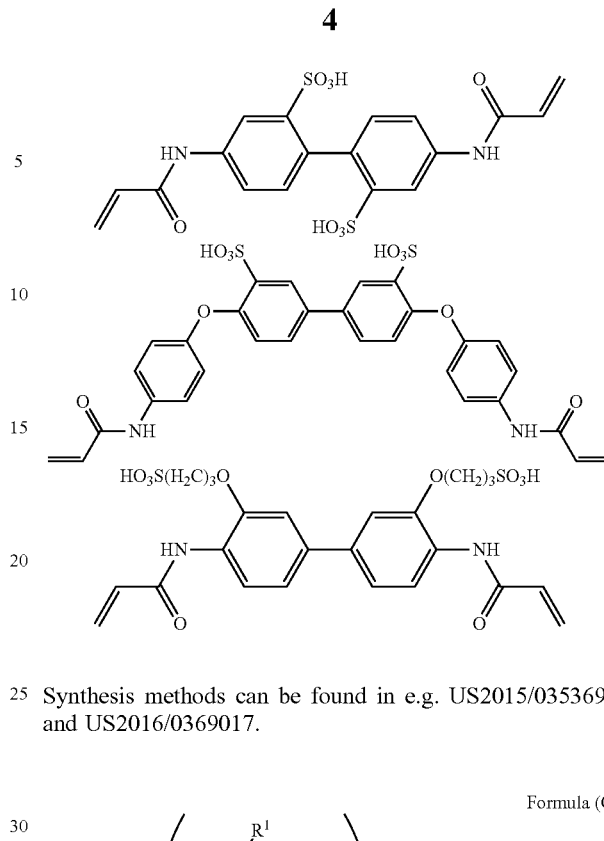

Synthesis methods can be found in e.g. US2015/0353696 and US2016/0369017.

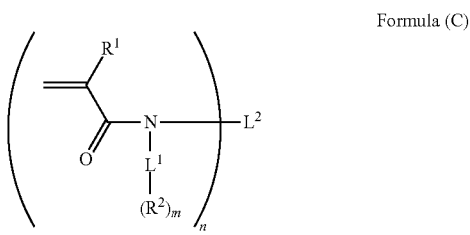

Formula (C)

wherein in Formula (C):
each $L^1$ independently represents an alkylene or aralkylene group;
n is 2 or 3, preferably 2;
each m independently is 1 or 2;
$L^2$ represents an n-valent linking group;
each $R^1$ independently represents a hydrogen atom or an alkyl group;
each $R^2$ independently represents —$SO_3^-M$ or —$SO_3^-R^3$;
each $M^+$ independently is as hereinbefore defined; and
$R^3$ represents an alkyl group or an aryl group.

In one embodiment of Formula (C), $M^+$ is $H^+$, an inorganic ion or an organic ion.

Examples of component (b) of Formula (C) include the following and alternative salts thereof:

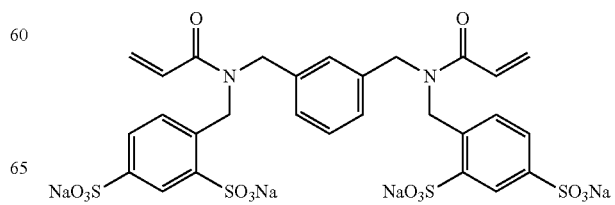

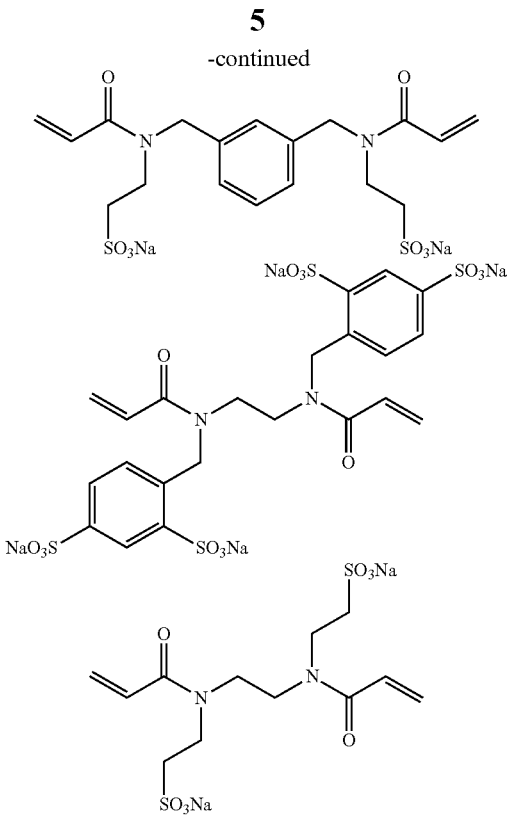

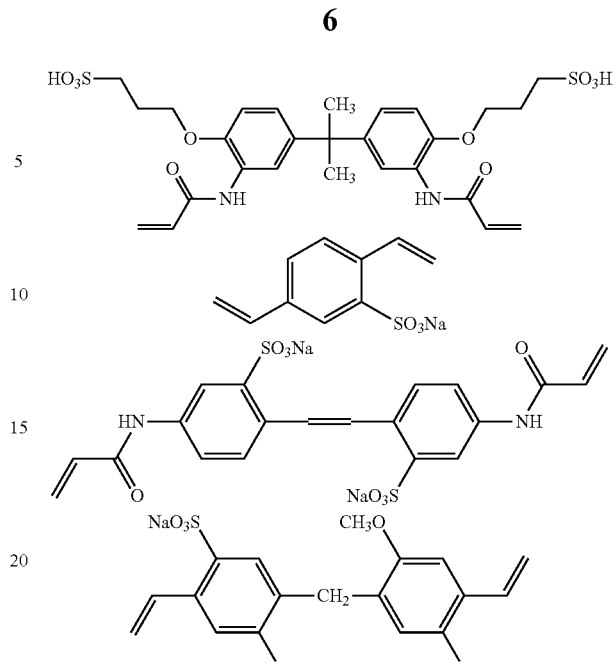

Synthesis methods can be found in US2016/0362526.

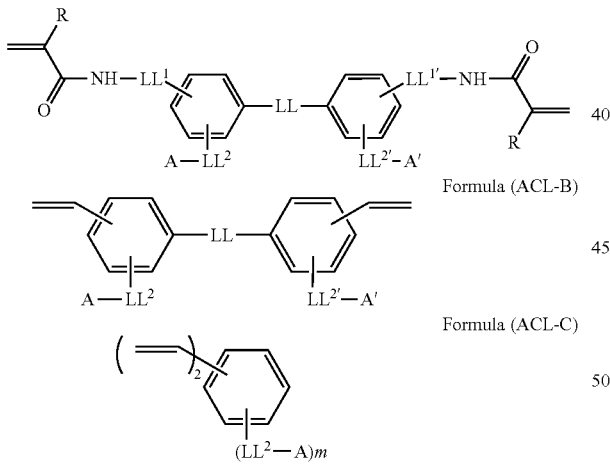

Synthesis methods can be found in EP3187516.

Formula (ACL-A)

Formula (ACL-B)

Formula (ACL-C)

wherein in Formulas (ACL-A), (ACL-B), (ACL-C):
each of R and R' independently represents a hydrogen atom or an alkyl group; LL represents a single bond or a bivalent linking group;
each of $LL^1$, $LL^{1'}$, $LL^2$, and $LL^{2'}$ independently represents a single bond or a bivalent linking atom or group;
each of A and A' independently represents a methyl or sulpho group in free acid or salt form group; and
m represents 1 or 2.

Examples of component (b) of formula (ACL-A), (ACL-B) or (ACL-C) include the following and alternative salts thereof:

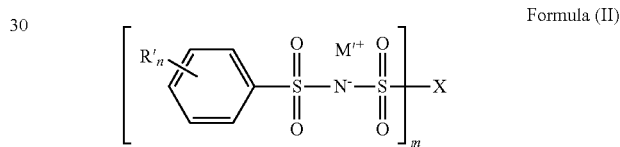

Formula (II)

wherein:
R' is vinyl($C_2H_3$), epoxy ($C_2H_3O$) or $C_{1-3}$-alkylenethiol ($C_{1-3}$-alkylene-SH):
n is 1 or 2;
m has a value of 1, 2 or 3;
$M'^+$ is $H^+$, $Li^+$, $Na^+$, $K^+$ or $NL_4^+$ wherein each L independently is H or $C_{1-3}$-alkyl;
wherein:
(a) when m and n both have a value of 1 then X is vinylphenyl or of Formula (III):

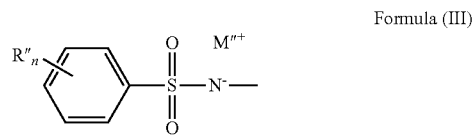

Formula (III)

wherein in Formula (III):
R'' is vinyl($C_2H_3$), epoxy ($C_2H_3O$) or $C_{1-3}$-alkylenethiol ($C_{1-3}$-alkylene-SH); and
$M'''^+$ is $H^+$, $Li^+$, $Na^+$, $K^+$ or $NL_4^+$ wherein each L independently is H or $C_{1-3}$-alkyl; (b) when m and n do not both have a value of 1 then X is $C_{1-6}$-alkylene, $C_{6-18}$-arylene, or $NR'''_{(3-m)}$ wherein each R''' independently is H or $C_1$-$C_4$ alkyl; (c) when m has a value of 1 and n shown in Formula (II) has a value of 2 then X is of Formula (III) (as defined above) or $C_{1-6}$-alkyl, $C_{6-18}$-aryl, or $N(R''')_2$ wherein each R''' independently is H or $C_{1-4}$ alkyl.

Examples of component (b) of Formula (II) include the following and alternative salts thereof:
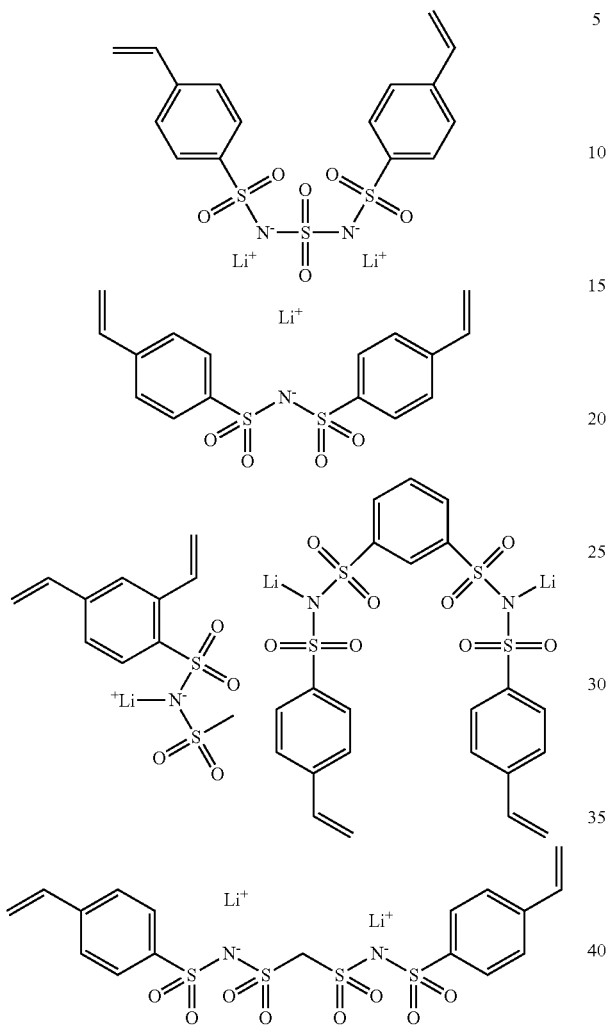
Synthesis methods can be found in e.g. JP2018043936.
Other examples of component (b) include the compounds M-23 to M-34 shown below and salts thereof:
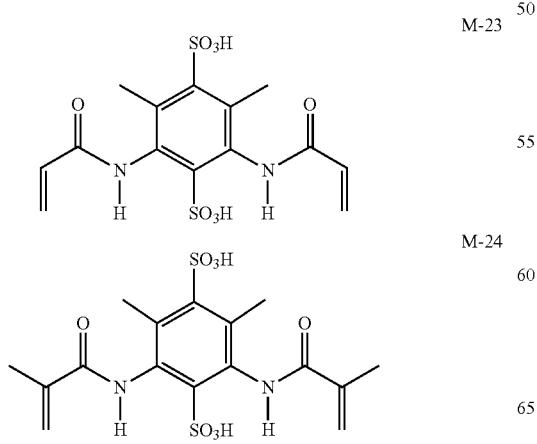
M-23
M-24
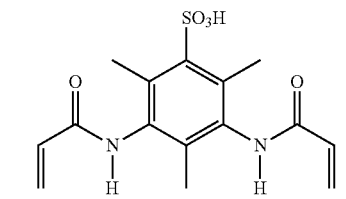
M-25
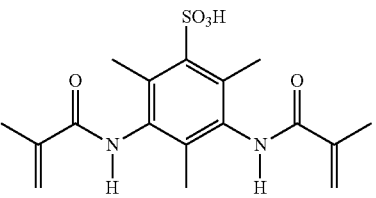
M-26
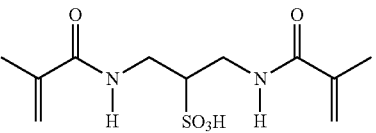
M-27
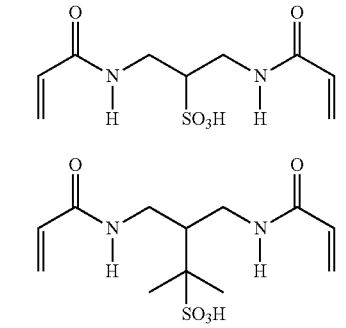
M-28
M-29
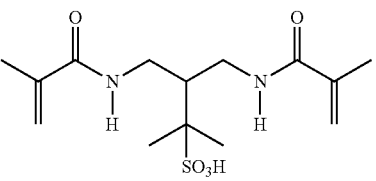
M-30
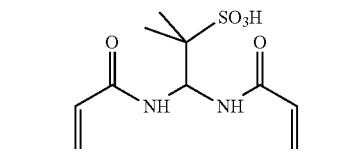
M-31
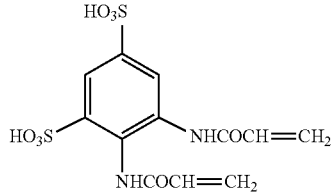
M-32
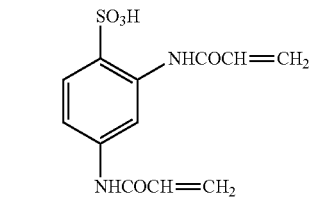
M-33

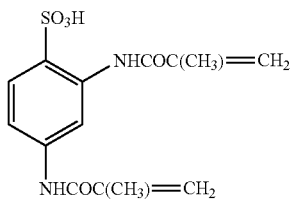

M-34

Preferably component (b) is chosen from the compounds according to Formula (ACL-B), (ACL-C) and salts thereof, and/or Formula (II), as this results in polymer films having good pH stability. Preferably the composition comprises at least 10 wt % of component (b) selected from compounds according to Formula (ACL-B), (ACL-C) and salts thereof, and/or Formula (II), more preferably at least 20 wt %.

Preferably, component (c) is an inert solvent. In other words, preferably component (c) does not react with any of the other components of the curable composition. In one embodiment the solvent preferably comprises water and optionally an organic solvent, especially where some or all of the organic solvent is water-miscible. The water is useful for dissolving component (a) and possibly also component (b) and the organic solvent is useful for dissolving any other organic components present in the composition.

Component (c) is useful for reducing the viscosity and/or surface tension of the composition. In some embodiments, the composition comprises 10 to 50 wt %, more preferably 10 to 40 wt %, especially 16 to 40 wt %, e.g. 23 to 38 wt %, of component (c).

Examples of inert solvents which may be used as component (c) include water, alcohol-based solvents, ether based solvents, amide-based solvents, ketone-based solvents, sulphoxide-based solvents, sulphone-based solvents, nitrile-based solvents and organic phosphorus based solvents. Examples of alcohol-based solvents which may be used as or in component (c) (especially in combination with water) include methanol, ethanol, isopropanol, n-butanol, ethylene glycol, propylene glycol, diethylene glycol, dipropylene glycol and mixtures comprising two or more thereof. In addition, preferred inert, organic solvents which may be used in component (c) include dimethyl sulphoxide, dimethyl imidazolidinone, sulpholane, N-methylpyrrolidone, dimethyl formamide, acetonitrile, acetone, 1,4-dioxane, 1,3-dioxolane, tetramethyl urea, hexamethyl phosphoramide, hexamethyl phosphorotriamide, pyridine, propionitrile, butanone, cyclohexanone, tetrahydrofuran, tetrahydropyran, 2-methyltetrahydrofuran, ethylene glycol diacetate, cyclopentylmethylether, methylethylketone, ethyl acetate, y-butyrolactone and mixtures comprising two or more thereof. Dimethyl sulphoxide, N-methyl pyrrolidone, dimethyl formamide, dimethyl imidazolidinone, sulpholane, acetone, cyclopentylmethylether, methylethylketone, acetonitrile, tetrahydrofuran, 2-methyltetrahydrofuran and mixtures comprising two or more thereof are preferable.

The composition preferably comprises 0 to 2 wt % of component (d). When it is intended to cure the composition thermally or using light (e.g. UV or visible light) the composition preferably comprises 0.001 to 2 wt %, especially 0.005 to 0.9 wt %, of component (d).

Examples of suitable thermal initiators which may be used as component (d) include 2,2'-azobis(2-methylpropionitrile) (AIBN), 4,4'-azobis(4-cyanovaleric acid), 2,2'-azobis(2,4-dimethyl valeronitrile), 2,2'-azobis(2-methylbutyronitrile), 1,1'-azobis(cyclohexane-1-carbonitrile), 2,2'-azobis(4-methoxy-2,4-dimethyl valeronitrile), dimethyl 2,2'-azobis(2-methylpropionate), 2,2'-azobis[N-(2-propenyl)-2-methylpropionamide, 1-[(1-cyano-1-methylethyl) azo]formamide, 2,2'-Azobis(N-butyl-2-methylpropionamide), 2,2'-Azobis(N-cyclohexyl-2-methylpropionamide), 2,2'-Azobis(2-methylpropionamidine) dihydrochloride, 2,2'-Azobis[2-(2-imidazolin-2-yl)propane]dihydrochloride, 2,2'-Azobis[2-(2-imidazolin-2-yl)propane]disulfate dihydrate, 2,2'-Azobis[N-(2-carboxyethyl)-2-methylpropionamidine] hydrate, 2,2'-Azobis{2-[1-(2-hydroxyethyl)-2-imidazolin-2-yl]propane} dihydrochloride, 2,2'-Azobis[2-(2-imidazolin-2-yl)propane], 2,2'-Azobis(1-imino-1-pyrrolidino-2-ethylpropane) dihydrochloride, 2,2'-Azobis{2-methyl-N-[1,1-bis(hydroxymethyl)-2-hydroxyethl]propionamide} and 2,2'-Azobis[2-methyl-N-(2-hydroxyethyl)propionamide].

Examples of suitable photoinitiators which may be included in the compositions as component (d) include aromatic ketones, acylphosphine compounds, aromatic onium salt compounds, organic peroxides, thio compounds, hexa-arylbiimidazole compounds, ketoxime ester compounds, borate compounds, azinium compounds, metallocene compounds, active ester compounds, compounds having a carbon halogen bond, and an alkyl amine compounds. Preferred examples of the aromatic ketones, the acylphosphine oxide compound, and the thio-compound include compounds having a benzophenone skeleton or a thioxanthone skeleton described in "RADIATION CURING IN POLYMER SCIENCE AND TECHNOLOGY", pp. 77-117 (1993). More preferred examples thereof include an alpha-thiobenzophenone compound described in JP1972-6416B (JP-S47-6416B), a benzoin ether compound described in JP1972-3981B (JP-S47-3981B), an alpha-substituted benzoin compound described in JP1972-22326B (JP-S47-22326B), a benzoin derivative described in JP1972-23664B (JP-S47-23664B), an aroylphosphonic acid ester described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JPS62-81345A), alpha-amino benzophenones described in JP1989-34242B (JP H01-34242B), U.S. Pat. No. 4,318,791A, and EP0284561A1, p-di(dimethylaminobenzoyl)benzene described in JP1990-211452A (JP-H02-211452A), a thio substituted aromatic ketone described in JP1986-194062A (JPS61-194062A), an acylphosphine sulfide described in JP1990-9597B (JP-H02-9597B), an acylphosphine described in JP1990-9596B (JP-H02-9596B), thioxanthones described in JP1988-61950B (JP-S63-61950B), and coumarins described in JP1984-42864B (JP-S59-42864B). In addition, the photoinitiators described in JP2008-105379A and JP2009-114290A are also preferable. In addition, photoinitiators described in pp. 65 to 148 of "Ultraviolet Curing System" written by Kato Kiyomi (published by Research Center Co., Ltd., 1989) may be used. Especially preferred photoinitiators include Norrish Type II photoinitiators having an absorption maximum at a wavelength longer than 380 nm, when measured in one or more of the following solvents at a temperature of 23° C.: water, ethanol and toluene. Examples include a xanthene, flavin, curcumin, porphyrin, anthraquinone, phenoxazine, camphorquinone, phenazine, acridine, phenothiazine, xanthone, thioxanthone, thioxanthene, acridone, flavone, coumarin, fluorenone, quinoline, quinolone, naphtaquinone, quinolinone, arylmethane, azo, benzophenone, carotenoid, cyanine, phtalocyanine, dipyrrin, squarine, stilbene, styryl, triazine or anthocyanin-derived photoinitiator.

According to a second aspect of the present invention there is provided a process for preparing a polymer film comprising polymerisation of a composition comprising a compound of Formula (I), wherein the compound of Formula (I) is as hereinbefore defined.

In the second aspect of the present invention, the preferences for the compound of Formula (I) are as defined herein in relation to the first aspect of the present invention.

In the second aspect of the present invention, the composition is preferably as defined in relation to the first aspect of the present invention. The preferences for the composition used in the process of the second aspect of the present invention are as described herein in relation to the first aspect of the present invention.

The compositions may be cured to prepare films according to the second aspect of the present invention by any suitable process, including thermal curing, photocuring, electron beam (EB) radiation, gamma radiation, and combinations of the foregoing. Optionally, dual curing—defined as the combination of two of the above mentioned curing techniques—may be used. However the compositions are preferably cured by photocuring, e.g. by irradiating the compositions by ultraviolet of visible light and thereby causing the curable components present in the composition to polymerise.

Preferably the polymerisation is performed in the presence of a porous support. For example, the compound of Formula (I)/composition according to the first aspect of the present invention is present in and/or on a porous support. The porous support provides mechanical strength to the polymer film resulting from the polymerisation and this is particularly useful when the polymer film is intended for use as a cation exchange membrane (CEM) or bipolar membrane (BPM).

As examples of porous supports which may be used there may be mentioned woven and non-woven synthetic fabrics and extruded films. Examples include wetlaid and drylaid non-woven material, spunbond and meltblown fabrics and nanofiber webs made from, e.g. polyethylene, polypropylene, polyacrylonitrile, polyvinyl chloride, polyphenylenesulfide, polyester, polyamide, polyaryletherketones such as polyether ether ketone and copolymers thereof. Porous supports may also be porous membranes, e.g. polysulphone, polyethersulphone, polyphenylenesulphone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene and polychlorotrifluoroethylene membranes and derivatives thereof.

The porous support preferably has an average thickness of between 10 and 800 µm, more preferably between 15 and 300 µm, especially between 20 and 150 µm.

Preferably the porous support has a porosity of 30 and 95%. The porosity of the support may be determined by a porometer, e.g. a Porolux™ 1000 from IB-FT GmbH, Germany.

The porous support, when present, may be treated to modify its surface energy, e.g. to values above 45 mN/m, preferably above 55 mN/m. Suitable treatments include corona discharge treatment, plasma glow discharge treatment, flame treatment, ultraviolet light irradiation treatment, chemical treatment or the like, e.g. for the purpose of improving the wettability of and the adhesiveness to the porous support to the polymer film.

Commercially available porous supports are available from a number of sources, e.g. from Freudenberg Filtration Technologies (Novatexx materials), Lydall Performance Materials, Celgard LLC, APorous Inc., SWM (Conwed Plastics, DelStar Technologies), Teijin, Hirose, Mitsubishi Paper Mills Ltd and Sefar AG.

Preferably the support is a polymeric support. Preferably the support is a woven or non-woven synthetic fabric or an extruded film without covalently bound ionic groups.

According to third aspect of the present invention there is provided a polymer film obtained by the process of the second aspect of the present invention.

Preferably the polymer film is a cation exchange membrane (CEM) or a bipolar membrane (BPM) comprising a cation exchange layer (CEL) obtained from polymerising a composition according to the first aspect of the present invention and/or by a process according to the second aspect of the present invention.

Preferably the BPM further comprises an anion exchange layer (AEL).

Preferably the polymer film obtained by the process according to the second aspect of the present invention comprises a structural group of Formula (A):

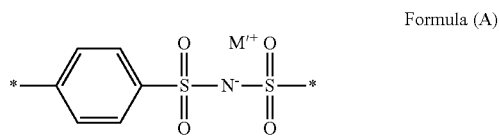 [SMILES: *c1ccc(S(=O)(=O)[N-]S(*)(=O)=O)cc1]

Formula (A)

wherein M⁺ is a cation preferably as defined above.

In Formula (A) the asterisks indicate where the structural group covalently attaches to other structural elements of the polymer film.

In a preferred process according to the second aspect of the present invention, the curable composition according to the first aspect of the present invention is applied continuously to a moving (porous) support, preferably by means of a manufacturing unit comprising a curable composition application station, one or more irradiation source(s) for curing the composition, a membrane collecting station and a means for moving the support from the curable composition application station to the irradiation source(s) and to the membrane collecting station.

The curable composition application station may be located at an upstream position relative to the irradiation source(s) and the irradiation source(s) is/are located at an upstream position relative to the membrane collecting station.

Examples of suitable coating techniques for applying the curable composition according to the first aspect of the present invention to a porous support include slot die coating, slide coating, air knife coating, roller coating, screen-printing, and dipping. Depending on the used technique and the desired end specifications, it might be desirable to remove excess coating from the substrate by, for example, roll-to-roll squeeze, roll-to-blade or blade-to-roll squeeze, blade-to-blade squeeze or removal using coating bars. Curing by light is preferably done at a wavelength between 400 nm and 800 nm using a dose between 40 and 1500 mJ/cm². In some cases additional drying might be needed for which temperatures between 40° C. and 200° C. could be employed.

The process according to the second aspect of the present invention may be used to prepare polymer films according to the third aspect of the present invention (e.g. CEMs and BPMs) in several ways, including multi-pass and single-pass processes. For example, in a two-pass process, each of a BPM's layers (e.g. the CEL and AEL) may be produced in separate steps. In the first step to make a first layer, an optionally pre-treated porous support may be impregnated with a first curable composition. To ensure a thin and pinhole-free membrane, the coating step is preferably followed by squeezing. The impregnated support may then be cured, yielding a layer hard enough to be handled in the coating machine, but still containing enough unreacted polymerisable groups to ensure good adhesion to the second layer. In the second step, a very similar process as for the first layer is employed: an optionally pre-treated porous support may be impregnated with a second curable composition and laminated to the first layer followed by squeezing-off excess composition and curing.

In an alternative method for making a BPM, the second layer may be coated on the first layer, followed by laminating an optionally pre-treated porous support at the side of the second curable composition whereby the second curable composition impregnates the porous support. The resulting laminate may be squeezed and cured to yield the composite membrane.

In the above described two-pass processes, preferably either the first curable composition or the second curable composition is as defined in the first aspect of the present invention.

In a more preferred single-pass process for preparing a BPM, two optionally pre-treated porous supports are unwound and each is impregnated with a curable composition (e.g. simultaneously or consecutively), wherein one of the curable compositions is as defined in the first aspect of the present invention to give a CEL, and the other curable composition comprises at least one cationic curable monomer to provide an AEL. The two layers (CEL from the composition according to the first aspect of the present invention and the AEL from the other curable composition) are then laminated together and squeezed, followed by curing of the resulting laminate to yield the final BPM.

The efficiency of the BPM according to the third aspect of the present invention may be enhanced by enlarging the surface area between the AEL and the CEL, e.g. by physical treatment (roughening) or by other means.

In one embodiment, the BPM according to the third aspect of the present invention optionally comprises a catalyst, e.g. metal salts, metal oxides, organometallic compounds, monomers, polymers or co-polymers or salt, preferably at the interface of the BPM's CEL and AEL.

Suitable inorganic compounds or salts which may be used as a catalyst include cations selected from, for example, group 1a through to group 4a, inclusive, together with the lanthanides and actinides, in the periodic table of elements, for example thorium, zirconium, iron, lanthanum, cobalt, cadmium, manganese, cerium, molybdenum, nickel, copper, chromium, ruthenium, rhodium, stannous, titanium and indium and combinations comprising two or more of the foregoing. Suitable salts which may be used as a catalyst include anions such as tetraborate, metaborate, silicate, metasilicate, tungstate, chlorate, phosphate, sulfate, chromate, hydroxyl, carbonate, molybdate, chloroplatinate, chloropaladite, orthovandate, tellurate and others and combinations comprising two or more of the foregoing.

Other examples of inorganic compounds or salts which may be used as a catalyst include, but are not limited to, $FeC_3$, $FeC_2$, $AlCl_3$, $MgCl_2$, $RuC_3$, $CrC_3$, $Fe(OH)_3$, $Al_2O_3$, $NiO$, $Zr(HPO_4)_2$, $MoS_2$, graphene oxide, Fe-polyvinyl alcohol complexes, polyvinyl alcohol (PVA), polyethylene glycol (PEG), polyethyleneimine (PEI), polyacrylic acid (PAA), co-polymer of acrylic acid and maleic anhydride (PAAMA) and hyperbranched aliphatic polyester and combinations comprising two or more of the foregoing.

The CEM (being a polymer film) according the third aspect of the present invention preferably has a very high density as a result of preparing the CEM from a composition according to the first aspect of the present invention having a low amount of component (c), e.g. from 10 to 40 wt % of component (c). Thus the present invention enables the production of polymer films (e.g. CEMs and BPMs) having a very high ion exchange capacity and therefore a high selectivity and low electrical resistance (ER).

Preferably, the ER (for 0.5 M NaCl) is lower than 5 ohm·cm², more preferably lower than 2.5 ohm·cm².

It is preferred that component (b) of the composition comprises a compound of Formula (ACL-B), (ACL-C), and/or Formula (II) (including salts of the foregoing) because this can result in polymer films (e.g. CEMs and BPMs) having excellent pH stability in the range from 0 to 14.

Furthermore, the CEMs and the BPMs containing a cationic exchange layer (CEL) according to the present invention have low electrical resistance. As a result, the CEMs and BPMs according to the present invention can be used in bipolar electrodialysis to provide high voltages at low current densities. Thus when the BPMs of the present invention are used in bipolar electrodialysis processes for the production of acid and base they can provide low energy costs and/or high productivity.

In an embodiment the polymer film according to the third aspect of the present invention is preferably a bipolar membrane or a membrane which is convertible by hydrolysis to a bipolar membrane.

The anion exchange layer (AEL) of the bipolar membrane is preferably obtainable by curing a composition comprising a curable cationic compound (i.e. the AEL composition). Thus the AEL composition preferably comprises a curable cationic compound.

A preferred curable cationic compound comprises at least two ethylenically unsaturated groups, e.g. a compound of Formula (IV):

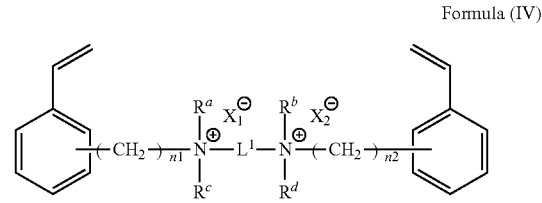

Formula (IV)

wherein:
L¹ is an alkylene group or an alkenylene group;
$R^a$, $R^b$, $R^c$, and $R^d$ are each independently an alkyl group or an aryl group, or
$R^a$ and $R^b$, and/or $R^c$ and $R^d$ may, together with the atoms to which they are attached, form a ring;
n1 and n2 each independently represent an integer having a value of 1 to 10; and
$X_1^-$ and $X_2^-$ each independently represent an anion.
L¹ is preferably ethylene ($CH_2CH_2$), propylene ($CH_2CH_2CH_2$), hexylene ($CH_2CH_2CH_2CH_2CH_2CH_2$), or vinylene ($CH=CH$).
When any of $R^a$, $R^b$, $R^c$, and $R^d$ is an alkyl group it is preferably a $C_{1-4}$-alkyl group, especially methyl.

When any of $R^a$, $R^b$, $R^c$, and $R^d$ is an aryl group it is preferably a $C_{6-10}$-aryl group, especially phenyl.

When $R^a$ and $R^b$, and/or $R^c$ and $R^d$, together with the atoms to which they are attached, form a ring, the ring is preferably a 5- or 6-membered ring.

The anions represented by $X_1^-$ and $X_2^-$ are preferably each independently halo, especially $Cl^-$.

Thus AEL composition preferably comprises the following ingredients:
(a2) a curable cationic compound comprising at least two ethylenically unsaturated groups;
optionally (b2) a compound comprising one and only one ethylenically unsaturated group;
optionally (c2) a solvent; and
optionally (d2) a radical initiator.

Preferably the AEL composition comprises at least one, more preferably at least two, especially all three of components (b2), (c2) and (d2).

Examples of compounds of Formula (IV) include the following:

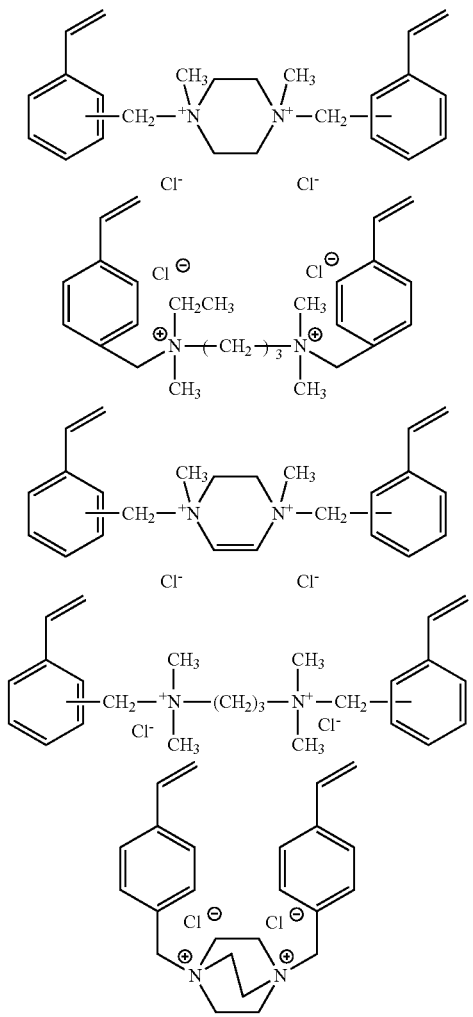

Synthesis methods can be found in e.g. EP3184558 and US2016/0001238

The AEL composition preferably comprises 30 to 80 wt % of component (a2), more preferably between 40 and 70 wt % of component (a2).

Preferably the AEL composition comprises:
(i) 30 to 80 wt % of component (a2);
(ii) 0 to 40 wt % of component (b2); and
(iii) 10 to 40 wt % of component (c2).

Component (b2) preferably comprises an aromatic group.

Component (b2) preferably comprises a cationic group.

Examples of compounds which may be used as component (b2) of the AEL composition include the following:

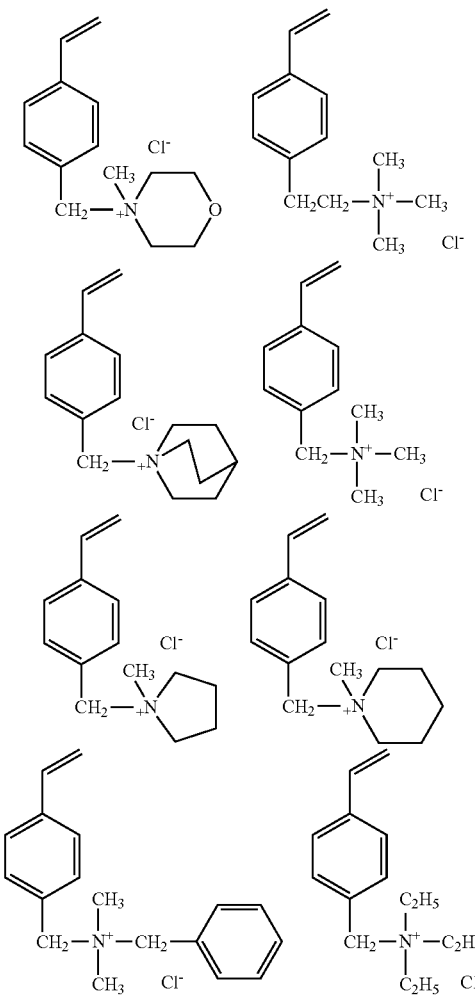

The above compounds may be prepared as described in, for example. US2016177006.

Preferably the molar ratio of component (a2) to component (b2) is from 9:1 to 1:4.

The AEL composition comprises 0 to 60 wt %, more preferably 5 to 45 wt %, most preferably 10 to 40 wt % of component (b2).

Component (c2) of the AEL composition preferably comprises water and optionally an organic solvent, especially where some or all of the organic solvent is water-miscible. The water is useful for dissolving the compound of Formula (IV) and component (c2), when present. The solvent is useful for reducing the viscosity and/or surface tension of the composition.

Examples of suitable solvents which may be used as component (c2) of the AEL composition include water, alcohol-based solvents, ether-based solvents, amide-based solvents, ketone-based solvents, sulfoxide-based solvents, sulfone-based solvents, nitrile-based solvents, organic phosphorus based solvents and mixtures comprising two or more thereof. Examples of alcohol-based solvents which may be used as or in component (c2) (especially in combination with water) include methanol, ethanol, isopropanol, n-butanol, ethylene glycol, propylene glycol, diethylene glycol, dipropylene glycol and mixtures comprising two or more thereof. In addition, preferred inert, organic solvents which may be used in component (c2) include dimethyl sulfoxide, dimethyl imidazolidinone, sulfolane, N-methylpyrrolidone, dimethyl formamide, acetonitrile, acetone, 1,4-dioxane, 1,3-dioxolane, tetramethyl urea, hexamethyl phosphoramide, hexamethyl phosphorotriamide, pyridine, propionitrile, butanone, cyclohexanone, tetrahydrofuran, tetrahydropyran, 2-methyltetrahydrofuran, ethylene glycol diacetate, cyclopentylmethylether, methylethylketone, ethyl acetate, y-butyrolactone and mixtures comprising two or more thereof. Dimethyl sulfoxide, N-methyl pyrrolidone, dimethyl formamide, dimethyl imidazolidinone, sulfolane, acetone, cyclopentylmethylether, methylethylketone, acetonitrile, tetrahydrofuran, 2-methyltetrahydrofuran and mixtures comprising two or more thereof are preferable.

In some embodiments, the AEL composition comprises 10 to 40 wt %, more preferably 10 to 35 wt %, most preferably 15 to 30 wt % of component (c2).

Examples of components (c2) to (d2) which may be included in the AEL composition used to form the AEL are as described above in relation to the composition used for the CEL as components (c) and (d) respectively. However component (c2) of the AEL composition is preferably aqueous.

Component (d2) preferably is or comprises a thermal initiator, a photoinitiator or a combination thereof. Most preferably component (d) is or comprises a photoinitiator.

Examples of suitable photoinitiators which may be used as component (d2) of the AEL composition include those described above for the composition according to the first aspect of the present invention.

The AEL composition preferably comprises 0.001 to 2 wt % of component (d2), more preferably 0.005 to 0.9 wt %.

The AEL composition and the CEL composition optionally each independently further comprise a polymerization Inhibitor. A polymerization Inhibitor can be useful for making the composition stable during storage and use.

As the polymerization inhibitor, well-known polymerization inhibitors can be used. Examples thereof include phenol compounds, hydroquinone compounds, certain amine compounds, mercapto compounds, and nitroxyl radical compounds.

Examples of phenol compounds include hindered phenols (phenols having a t-butyl group in an ortho position, and representatively 2,6-di-t-butyl-4-methylphenol), and bisphenols. Specific examples of hydroquinone compounds include monomethyl ether hydroquinone. Specific examples of amine compounds include N-nitroso-N-phenyl hydroxylamine and N,N-diethylhydroxylamine. Specific examples of nitroxyl radical compounds include 4-hydroxy TEMPO (4-hydroxy-2,2,6,6-tetramethylpiperidine-1-oxyl free radical).

The AEL composition and the CEL composition optionally each independently further comprise two or more polymerisation inhibitors.

When the composition used to form the AEL or the CEL comprises a polymerization inhibitor the content is preferably 0.01 to 5 wt %, more preferably 0.01 to 1 wt %, and further preferably 0.01 to 0.5 wt %, relative to the total weight of the composition.

The AEL composition and the CEL composition optionally each independently further comprise a surfactant, a polymer dispersing agent and/or a crater inhibitor.

In order to adjust film physical properties of the AEL composition and/or CEL composition, various polymer compounds may be included therein. Suitable polymer compounds include acrylic polymers, polyurethane resins, polyamide resins, polyester resins, epoxy resins, phenol resins, polycarbonate resins, polyvinyl butyral resins, polyvinyl formal resins, shellac, vinylic resins, acrylic resins, rubber-based resins, waxes, and natural resins and combinations of two or more of the foregoing.

The AEL composition and the CEL composition optionally each independently further comprise a surfactant, e.g. a nonionic surfactant, a cationic surfactant, an organic fluoro surfactant, or the like. Specific examples of surfactants include anionic surfactants (e.g. an alkylbenzene sulfonic acid salt, alkylnaphthalene sulfonic acid salts, higher fatty acid salts, sulfonic acid salts of higher fatty acid esters, sulfuric acid ester salts of higher alcohol ethers, sulfonic acid salts of higher alcohol ethers, alkylcarboxylic acid salts of higher alkylsulfone amides and alkylphosphoric acid salts) and non-ionic surfactants (e.g. poly(oxyethylene)alkyl ethers, poly(oxyethylene)alkyl phenyl ethers, poly(oxyethylene) fatty acid esters, sorbitan fatty acid esters, ethylene oxide adducts of acetylene glycol, ethylene oxide adducts of glycerin, and polyoxyethylene sorbitan fatty acid esters). Other examples suitable surfactants include amphoteric surfactants (e.g. alkyl betaines and amide betaines), silicone-based surfactants and a fluorine-based surfactant. The surfactant can be suitably selected from the surfactant known in the art or a derivative thereof.

The AEL composition and the CEL composition optionally each independently further comprise a polymer dispersant.

Specific examples of the polymer dispersant include polyvinyl pyrrolidone, polyvinyl alcohol, polyvinyl methyl ether, polyethylene oxide, polyethylene glycol, polypropylene glycol and polyacryl amide. Among these, it is preferable to use polyvinyl pyrrolidone.

The AEL composition and the CEL composition optionally each independently further comprise a crater inhibitor (sometimes referred to as a surface conditioner), a levelling agent, or a slipping agent to prevent unevenness on the CEL or AEL surface, examples of which include organomodified polysiloxanes (mixtures of polyether siloxane and polyether), polyether-modified polysiloxane copolymers and silicon-modified copolymers.

Examples of the commercially available surfactants which may be included in the compositions used to form AEL and/or the CEL include Tego Glide™ 432, Tego Glide™ 110, Tego Glide™ 130, Tego Glide™ 406, Tego Glide™ 410, Tego Glide™ 411, Tego Glide™ 415, Tego Glide™ 420, Tego Glide™ 435, Tego Glide™ 440, Tego Glide™ 450, Tego Glide™ 482, Tego Glide™ A115, Tego Glide™ B1484 and Tego Glide™ ZG400 (all are product names), manufactured by Evonik industries GmbH.

The AEL composition and the CEL composition preferably each independently comprise 0 to 10 wt %, more preferably 0 to 5 wt % and especially 1 to 2 wt % of crater inhibitor (relative to the total weight of the relevant composition).

In a preferred embodiment the bipolar membrane comprises a catalyst. A catalyst may be included in the AEL composition and/or the CEL composition curable composition. Also it is possible to apply the catalyst (as a post-treatment step) to the AEL (e.g. before applying the CEL composition thereto) using, for example, (but not limited to), dipping, air knife coating, microroller coating, spraying, chemical (vapour) deposition) or physical (vapour) deposition.

Examples of suitable catalysts are as described above.

When the AEL composition or the CEL composition comprises a catalyst, the amount of catalyst is preferably up to 5 wt %, e.g. 0.001 wt % to 1 wt %, relative to the weight of the relevant composition.

The bipolar membrane may be prepared by a process comprising the steps:
(i) applying the AEL composition to a support;
(ii) at least partly curing the AEL composition, thereby forming an anion exchange layer (AEL);
(iii) applying the CEL composition to the AEL; and
(iv) curing the CEL composition, thereby forming a cation exchange layer (CEL) on the AEL.

In step (ii) preferably the AEL composition is photocured, e.g. using ultraviolet light. Therefore preferably component (d2) of the AEL composition is or comprises a photoinitiator.

In step (ii), preferably the AEL composition is cured to such an extent that the resultant AEL can be processed in a curable composition application station while still comprising unreacted ethylenically unsaturated groups that are available for crosslinking to the monomers of the CEL composition.

In step (iv) the CEL composition is preferably cured thermally. Therefore preferably component (d) of the CEL composition is or comprises a thermal initiator.

A suitable temperature for curing the CEL composition is from 50 to 120° C., more preferably from 50 to 100° C., especially 60 to 85° C.

Thermal curing of the CEL composition typically takes from one minute or more to several hours.

Optionally the CEL composition is cured after being sandwiched between polymer films to prevent evaporation of component (c), when present.

The compositions are preferably applied in step (i) and (iii) in a continuous manner, preferably by means of a manufacturing unit comprising composition application stations, one or more curing stations comprising irradiation source(s) when a composition is photocurable, one or more curing stations comprising a one or more heat source(s) when a composition is thermally curable, a bipolar membrane collecting station and a means for moving the supports from the composition application stations to the curing station(s) and to the bipolar membrane collecting station.

The composition application stations may be located at an upstream position relative to the curing station(s) and the curing station(s) is/are located at an upstream position relative to the bipolar membrane collecting station.

Examples of application techniques include slot die coating, slide coating, air knife coating, roller coating, screen printing, and dipping. Depending on the used technique and the desired end specifications, it might be necessary to remove excess composition from the substrate by, for example, roll-to-roll squeeze, roll-to-blade or blade-to-roll squeeze, blade-to-blade squeeze or removal using coating bars.

Photocuring by ultraviolet or visible light is preferably performed at a wavelength between 100 nm and 800 nm, typically using a dose of light of between 40 and 1500 mJ/cm$^2$. Thermal curing is preferably performed at a temperature of between 20° C. and 100° C., e.g. for a period of 0.01 hour to 24 hours.

The performance of the bipolar membranes is characterized by means of an intensity versus voltage plot. For measuring this plot a six compartment cell was used. The $1^{st}$ electrode compartment contained a platinum plate as cathode and was separated from the $2^{nd}$ compartment by a CEM (CMX from Astom). The electrode compartment was filled with 0.5 M $Na_2SO_4$. Between the $2^{nd}$ and the $3^{rd}$ compartment a reference BPM (from Fumatech) was present. Both the $2^{nd}$ and the $3^{rd}$ compartment contained a 0.5M NaCl solution. Between the $3^{rd}$ and $4^{th}$ compartment the BPM to be analyzed was placed. Between the $4^{th}$ and the $5^{th}$ compartment the same reference BPM was placed (from Fumatech) and between the $5^{th}$ and the $6^{th}$ compartment a CEM (CMX from Astom). The $4^{th}$ and $5^{th}$ compartments are also filled with a 0.5M NaCl solution. The $6^{th}$ compartment containing a platinum plate as anode is an electrode compartment and contained 0.5 M $Na_2SO_4$.

By using the above cell the solutions were pumped through the compartments at a temperature of 25° C. and applying a current density of 600 μm$^2$. Bipolar voltages were measured by using a Harber luggin capillary placed at each side of the BPM to be analyzed.

EXAMPLES

TABLE 1

| | Ingredients | |
|---|---|---|
| Abbreviation | Component Type | Description |
| Li-BVBSI | (a) | Benzenesulphonamide, 4-ethenyl-N-[(4-ethenylphenyl)sulphonyl]-, lithium salt |
| 4OH-TEMPO | | 4-hydroxy-2,2,6,6-tetramethylpiperidin-1-oxyl, a polymerization inhibitor from Sigma-Aldrich |
| LISS | | Styrene sulphonate, lithium salt from Tosoh Chemicals (A Comparative Example) |
| MM-Tf | | Benzenesulphonamide, 4-ethenyl-N-[(trifluoromethyl)sulphonyl]-, lithium salt (A Comparative Example) |
| MM-M | (a) | Benzenesulphonamide, 4-ethenyl-N-(methylsulphonyl)-, lithium salt |
| MM-A | (a) | Benzenesulphonamide, 4-ethenyl-N-(aminosulphonyl)-, lithium salt |
| MM-P | (a) | Benzenesulphonamide, 4-ethenyl-N-(phenylsulphonyl)-, lithium salt |
| XL-D | (b) | Benzenesulphonamide, 2,4-diethenyl-N-(methylsulphonyl)-, lithium salt |
| XL-2 | (b) | 1,3-[N-(ethenylphenylsulphonyl)benzene sulphonamide], dilithium salt |
| IPA | (c) | Isopropyl alcohol from Sigma-Aldrich |
| MCH | (c) | Methylcyclohexane from Sigma-Aldrich |
| 1MP | (c) | 1-methyl pyrrole from Sigma-Aldrich |
| TEOA | (c) | Triethanolamine from Sigma-Aldrich |
| THF | | Tetrahydrofuran from Sigma-Aldrich |
| LIH | | Lithium hydride from Sigma-Aldrich |
| Celite ™ | | Celite™ S, diatomaceous earth ($SiO_2$) from Sigma-Aldrich |
| DVBS-Na | (b) | Divinylbenzenesulphonate, Sodium salt from Tosoh Chemicals |
| PETA | (b) | pentaerythritol tetraacrylate from Sigma-Aldrich |
| EGDMA | (b) | ethylene glycol dimethacrylate from Sigma-Aldrich |
| LAP | (d) | phenyl-2,4,6-trimethylbenzoylphosphinate, lithium salt from Sigma-Aldrich (a photoinitiator) |

TABLE 1-continued

Ingredients

| Component Abbreviation | Type | Description |
|---|---|---|
| Na-AMPS | | Sodium salt of 2-acrylamideo-2-methylpropane sulfonic acid, 50 wt % in water from Sigma-Aldrich. (A Comparative Example) |
| M-11 | | A cross-linker with two acrylamide groups obtained from Fujifilm. Structure is shown below, preparation method is described in EP2965803. |
| Omnirad ™ TPO-L | (d) | Ethyl(2,4,6-trimethylbenzoyl)-phenyl phosphinate, a photoinitiator from IGM Resins |
| Omnirad ™ 1173 | (d) | 2-hydroxy-2-methyl-1-phenylpropanone, a photoinitiator from IGM Resins |

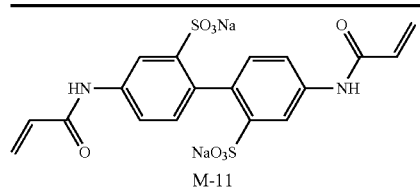

M-11

Inductively coupled plasma atomic emission spectroscopy (ICP-OES) was used to quantify the lithium content of the prepared compounds of Formula (I). The ICP-OES analyses were performed using a Thermo iCAP™ PRO XP ICP-OES apparatus from Thermo Fisher Scientific. A concentric nebulizer was used in conjunction with a Cyclonic spray chamber. Approximately 50 mg of each compound under test was dissolved in 50 cm$^3$ of Milli-Q water. The dissolved compounds were diluted 100 times, and acidified with 0.5% concentrated nitric acid containing Yttrium as internal standard. All samples were prepared and measured in duplicate. Results are expressed as g of Li per kg monomer.

The structures of the compounds of Formula (I) were confirmed by $^1$H-NMR using a Magritek Spincolve 60 Carbon (60 MHz, 4 scans) NMR spectrometer. Samples for analysis were prepared by dissolving 5 wt % of each compound of Formula (I) in DMSO-d$_6$.

The purity of the compounds of Formula (I) was determined by HPLC-MS. A Waters ACQUITY UPLC System with 2D Technology was used. The UPLC was equipped with 2 pumps (BSM and QSM), FTN sample manager, column manager and a PDA detector (192 until 400 nm). The HPLC was equipped with a Waters Xbridge C$_8$ 5 μm 2.1*150 mm column, using 45° C. as working temperature. Additionally, the instrument was also equipped with Waters Q-TOF premier mass spectrometer with ESI and ESCi ionisation options. Dual detection mode was used to collect the chromatogram. The PDA detector collected signals at 245 nm. The mass detector was set in negative mode to detect anionic molecules. Samples containing compounds of Formula (I) were prepared as follows: 5 mg of the compounds of Formula (I) was dissolved in 50 ml Milli-Q water. The resultant solution was diluted 10 times with Milli-Q water and 10 μl volume was injected into the abovementioned HPLC-MS apparatus for analysis.

Table 2 shows the typical method employed to elute the samples of the compounds of Formula (I) indicated in Table 3. In Table 3, an overview of the retention times and molecular weights recorded for material identification is given

TABLE 2

HPLC method

| Time (min) | Flow Rate (ml/min) | Solvent 1 (%): water | Solvent 2 (%): MeOH |
|---|---|---|---|
| 0.0 | 0.6 | 95.0 | 5.0 |
| 1.0 | 0.6 | 95.0 | 5.0 |
| 30.0 | 0.6 | 0.0 | 100.0 |
| 34.1 | 0.6 | 95.0 | 5.0 |
| 40.0 | 0.6 | 95.0 | 5.0 |

TABLE 3

Identification of example materials and impurities.

| Compound | Exact mass (Da) | Mass observed (Da) | Retention time (min)* |
|---|---|---|---|
| LiSS | 190 | 183 | 12.2 |
| MM-M | 267 | 260 | 12.5 |
| MM-A | 268 | 261 | 11.5 |
| MM-P | 329 | 322 | 17.9 |
| MM-Tf | 321 | 314 | 17.5 |

*Retention times are indicative.

The solubility of the compounds of Formula (I) was determined visually or by UV-spectrometry. For each compound of Formula (I), three solutions were prepared: one solution at 30 wt %, one solution at 60 wt %, and one solution at 70 wt % containing a 1:1 molar ratio of the compound of Formula (I) with cross-linker Li-BVBSI. 500 ppm 4OH-TEMPO was included in all three solutions to prevent premature polymerisation. The solutions were kept in a water bath of 40° C. overnight and centrifuged prior inspection. UV spectra were recorded in a Cary™ 100 UV-visible spectrophotometer from Agilent Technologies using a 1 mm path length quartz cuvette.

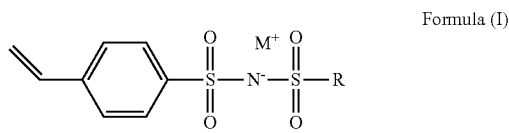

Formula (I)

TABLE 4

Solubility in water of several compounds of Formula (I) and of comparative compounds

| R | M | Solubility in water at 40° C. (wt %) |
|---|---|---|
| methyl | Li | >60 |
| phenyl | Li | >60 |
| Trifluoromethyl (Comparative) | Li | >60 |
| amino | Li | >60 |
| LiSS (Comparative) | | 40 |

In separate experiments from those shown in Table 4 and for comparison, the highest solubility achieved by mixing lithium styrene sulphonate (LiSS) and DVBS-Na was found to be 55 wt %. Furthermore, when the compounds of Formula (I) shown in Table 2 where M is Li were combined with DVBS-Na the solubility achieved was at least 60 wt % in all cases. When the compounds of Formula (I) shown in Table 4 where M is Li were combined with crosslinkers from the bis-sulphonimide family (e.g. of Formula (11)), the highest solubility achieved reached solid contents over 70 wt %.

ER (ohm·cm$^2$) of the polymer films prepared in the Examples was measured by the method described by Dlugolecki et al., J. of Membrane Science, 319 (2008) on page 217-218 with the following modifications:

- the auxiliary membranes were CMX and AMX from Tokuyama Soda, Japan;
- the capillaries as well as the Ag/AgCl references electrodes (Metrohm type 6.0750.100) contained 3M KCl;
- the calibration liquid and the liquid in compartment 2, 3, 4 and 5 was 0.5 M NaCl solution at 25° C.;
- the effective membrane area was 9.62 cm$^2$;
- the distance between the capillaries was 5.0 mm;
- the measuring temperature was 25° C.;
- a Cole Parmer Masterflex console drive (77521-47) with easy load II model 77200-62 gear pumps was used for all compartments;
- the flowrate of each stream was 475 ml/min controlled by Porter Instrument flowmeters (type 150AV-B250-4RVS) and Cole Parmer flowmeters (type G-30217-90); and
- the samples were equilibrated for at least 1 hour at room temperature in a 0.5 M solution of NaCl prior to measurement.

Preferably, the ER (for 0.5 M NaCl) is lower than 5 ohm·cm$^2$, more preferably lower than 2.5 ohm·cm$^2$.

Measurement of Permselectivity (PS)

The permselectivity PS (%) that is the selectivity to the passage of ions of opposite charge to that of the cationically charged membranes prepared in the examples, was measured as follows. The membrane to be analysed was placed in a two-compartment system. One compartment is filled with a 0.05M solution of NaOH and the other with a 0.5M solution of NaOH.

Settings:

- the capillaries as well as the Ag/AgCl reference electrodes (Metrohm type 6.0750.100) contained 3M KCl;
- the effective membrane area was 9.62 cm$^2$;
- the distance between the capillaries was ca 15 mm;
- the measuring temperature was 21.0±0.2° C.;
- a Cole Parmer Masterflex console drive (77521-47) with easy load II model 77200-62 gear pumps was used for the two compartments;
- Porter Instrument flowmeters (type 150AV-B250-4RVS) and Cole Parmer flowmeters (type G-30217-90) were used to control the flow constant at 500 ml/min;
- The samples were equilibrated for 1 hr in a 0.5M NaOH solution prior to measurement. The voltage was read from a regular VOM (multitester) after 20 minutes.

Preferably the PS for NaOH is at least 50%.

pH Stability

Stability in acidic and/or alkaline conditions is preferred as it widens the scope of applications the CEM's can be used in. Stability is typically tested by immersing the samples in 4M of HCl or NaOH at 80 degrees for 7 days. After this treatment, the selectivity should be at least 80% of the original selectivity to be judged as stable.

Preparation of Compounds of Formula (I) and Comparative Compound

MM-Tf, MM-A, MM-P and MM-M (referred to above) had the structures shown below.

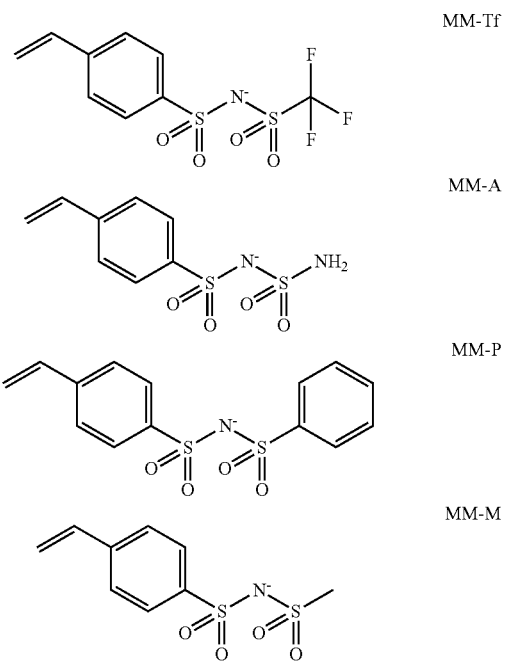

The compounds MM-Tf, MM-A, MM-P and MM-M were synthesized according to the following general scheme and procedure:

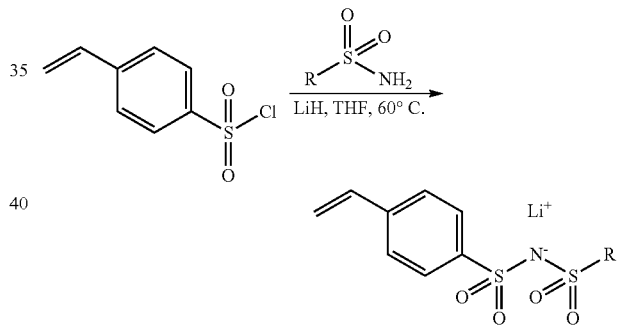

General Procedure

Before the synthesis, the corresponding sulfamide was dried in a vacuum oven overnight at 30° C. To a solution of the dried sulfamide (0.100 mol, 1 moleq) and 4OH-TEMPO (30 mg, 500 ppm) in THF (100 mL) was added LiH (0.300 mol, 3 moleq) as a solid at once. The reaction mixture was stirred for 30 minutes at room temperature. Then, a solution of vinyl benzyl sulphonyl chloride (0.100 mol, 1 moleq) in THF (50 mL) was added and the reaction mixture was heated to 60° C. (water bath temperature) for 16 h. The resulting solution was filtrated over celite and the resulting foam was dissolved in 500 mL ethyl acetate. Celite was added and the resulting slurry was stirred for 5 minutes. Then, the celite was filtered off and washed with 100 mL ethyl acetate. The solvent was then evaporated in vacuum and the resulting white foam was crushed with 500 mL diethyl ether overnight. The resultant compound of Formula (i) was collected by filtration and isolated as a white hygroscopic powder. Data on yield and purity are given in Table 5 below.

TABLE 5

Compounds of Formula (I) and comparative compound

| R | Yield | Purity | Residual solvent | Residual LiSS | Li content |
|---|---|---|---|---|---|
| methyl | 80% | >94% | <1% | <4% | 26-30 g/kg |
| phenyl | 79% | >96% | <1% | <2% | 23-28 g/kg |
| trifluoromethyl | 70% | 81% | 17% | | |
| amino | 63% | >92% | <1% | <6% | 26-40 g/kg |

Composition Examples 1 to 10. Comparative Examples CEx1 to CEx4 and Polymer Films Table 6 below describes compositions of Examples 1 to 10 according to the first aspect of the present invention and Comparative Examples CEx1 to CEx4. Each of the compositions was polymerised to form a polymer film of thickness 100 μm by coating the compositions onto a polypropylene/polyethylene porous support for reinforcement with the aid of a 100 μm Meyer bar. The electrical resistance ER of the resultant polymer films was measured using 0.5N NaCl, the permselectivity PS as described above and the result is shown in the final column of Table 6.

TABLE 6

Experimental results

| | Components and their amount in the composition | | | | | | ER | PS |
|---|---|---|---|---|---|---|---|---|
| Example | (a) | (a) (wt %) | (b) | (b) (wt %) | (c) | (c) (wt %) | (0.5N NaCl) | 0.05/0.5N NaOH |
| Ex 1 | MM-M | 25 | XL-2 | 35 | water/1MP | 29/10 | 1.2 | 52% |
| Ex 2 | MM-M | 17.9 | XL-2/PETA | 38.7/9.4 | water/IPA/1MP | 20.5/3.5/9 | 1.9 | 62% |
| Ex 3 | MM-M | 8.9 | XL-2/PETA | 38.7/18.4 | water/IPA/1MP | 20.5/3.5/9 | 2.0 | 81% |
| Ex 4 | MM-M | 17.9 | XL-2/PETA | 25.8/22.3 | water/IPA/1MP | 20.5/3.5/9 | 2.0 | 67% |
| Ex 5 | MM-M | 17.9 | XL-2/EGDMA | 38.7/9.4 | water/IPA/1MP | 20.5/3.5/9 | 1.8 | 72% |
| Ex 6 | MM-M | 12 | XL-D | 54 | water/MCH/1MP | 20.5/3.5/9 | 1.5 | 52% |
| Ex 7 | MM-M | 25 | Li-BVBSI | 35 | Water/DMSO/IPA/1MP | 19.3/6.4/3.3/10 | 1.5 | 50% |
| Ex 8 | MM-M | 19 | XL-2 | 41 | Water/IPA/1MP | 24.9/4.1/10 | 1.16 | 61% |
| Ex 9 | MM-P | 34 | Li-BVBSI | 36 | Water/TEOA | 26/3 | 1.3 | 60% |
| Ex 10 | MM-A | 30 | Li-BVBSI | 40 | Water/TEOA | 26/3 | 1.4 | 55% |
| CEx 1 | LiSS | 36 | Na-DVBS | 20 | Water/TEOA | 39.5/3.5 | 1.1 | 35% |
| CEx 2 | LiSS | 26 | XL-2 | 31 | Water/TEOA | 38/4 | 0.94 | 16% |
| CEx 3 | MM-tF | 39 | Li-BVBSI | 31 | Water/TEOA | 26/2 | 0.87 | 0% |
| CEx 4 | Na-AMPS | 30 | M-11 | 30 | Water | 39 | 2.5 | 60% |

*All formulations shown in Table 6 included 1 wt % of LAP as photoinitator. Na-AMPS amount in the table is based on 100% solids, the water present in the solution as obtained from the supplier is addes to the solvent amount.

TABLE 7 pH stability results

| Example | Fresh PS (0.05/0.5N NaOH) | PS after 7 days 4M HCl @ 80° C. (0.05/0.5N NaOH) | PS after 7 days 4M NaOH @ 80° C. (0.05/0.5N NaOH) |
|---|---|---|---|
| Ex 1 | 52% | 51% | 50% |
| Ex 9 | 60% | 58% | 59% |
| CEx 4 | 60% | 0% | 0% |

Infrared Analysis

ATR-FTIR spectra were recorded on polymer films using a PerkinElmer Frontier FT-IR Spectrometer, using the Universal ATR Sampling Accessory equipped with a diamond top plate. The spectra were recorded in the range 4000-580 cm$^{-1}$, with a spectral resolution of 4 cm$^{-1}$ and the spectra were averaged over 10 recorded spectra. For optimal peak resolution, the samples of polymer film were pushed against the ATR diamond with a conical shaped tip (force gauge 75). The results for Example 7 and Comparative Example CEx2 are shown in Table 8 below:

TABLE 8

Infrared Analysis Results

| Example | Peaks found (cm$^{-1}$) below 60% T % between 900-4000 cm$^{-1}$ |
|---|---|
| Ex 7 | 1262, 1151, 1132, 1076, 1048, 1011 |
| CEx 2 | 1183, 1126, 1035, 1010 |

From Table 8, the strong IR peaks at 1262, 1151, 1076 and 1048 can be used to distinguish the bisulfonimide functional group from the sulfonate functional group in polymer film samples.

Extraction Analysis

In order to analyse the polymerisation degree of polymer films and show the presence of the claimed materials in polymer films, samples of polymer films were extracted with purified water (10 cm$^2$ in 50 mL purified water) after which the extraction liquid was analysed in the HPLC-MS method described above:

TABLE 9

Extraction results

| Example | Material a | Extracted material a (mg/ml) | Material b | Extracted material b (mg/ml) |
|---|---|---|---|---|
| Ex 7 | MM-M | 13 | Li-BVBSI | 8 |
| Ex 9 | MM-P | 12 | Li-BVBSI | 9 |

TABLE 9-continued

Extraction results

| Example | Material a | Extracted material a (mg/ml) | Material b | Extracted material b (mg/ml) |
|---|---|---|---|---|
| Ex 1 | MM-M | 14 | XL-2 | 11 |
| Ex 10 | MM-A | 18 | Li-BVBSI | 15 |

Preparation of the AEL

An AEL composition was prepared containing 58 wt % of 1,4-diazoniabicyclo[2.2.2]octane, 1,4-bis[(4-ethenylphenyl)methyl]-, chloride, 19 wt % of water, 6 wt % of IPA, 1 wt % of Omnirad™ TPO-L and 1 wt % of Omnirad™ 1173. The AEL composition was coated on a non-woven polyethylene fabric and cured by UV.

Preparation of the CEL and Application to the AEL to Produce a BPM

CEL compositions were prepared according to Table 7 (Example 9 & Comparative Example CEx4). The CEL compositions were coated on the AEL prepared as described above, then a second non-woven polyethylene fabric was placed onto the layer of CEL composition, excess CEL composition was wiped off and the CEL composition was cured using UV light.

The electrochemical properties and the bipolar characteristics of this bipolar membrane were compared to a reference membrane using a so-called current-voltage characteristic (I-U curve), where the current density is measured as a function of the applied voltage. Typically, the lower the voltage (U) required to generate a given current density, i.e. 600 mA/cm², the lower is the ionic resistance of one or both ion exchange layers in particular, and the bipolar membrane in general. Low ionic resistance, in this case of the cation exchange layer, results in membranes that are more energy efficient.

TABLE 10

ER of CEL and voltage U of BPM at 600 mA/cm²

| Example | ER of CEL (ohm/cm²) | U @ 600 mA/cm² of BPM (Volt) |
|---|---|---|
| Ex 9 | 1.3 | 3.8 |
| CEx 4 | 2.5 | 5.5 |

The invention claimed is:

1. A polymer film obtained by polymerising a composition comprising:
   (a) a compound Formula (I);

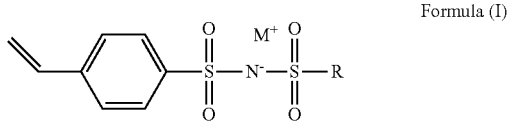

Formula (I)

wherein:
   R is $C_{1-4}$-alkyl, $NH_2$ or $C_{6-12}$-aryl; and
   $M^+$ is a cation;
   (b) a monomer comprising at least two polymerisable groups; and
   (c) a solvent.

2. The polymer film according to claim 1 wherein the composition comprises:

(a) 5 to 60 wt % of component (a);
   (b) 10 to 70 wt % of component (b);
   (c) 10 to 50 wt % of component (c).

3. The polymer film according to claim 1 wherein R is methyl, phenyl, benzyl or $NH_2$.

4. The polymer film according to claim 1 wherein the polymerisable groups are each independently selected from (meth) acrylic groups and vinyl groups.

5. The polymer film according to claim 1 wherein component (b) further comprises an anionic group.

6. The polymer film according to claim 5 wherein the anionic group comprises a sulpho group or a bissulphonylimide group.

7. The polymer film according to claim 1 wherein component (a) is free from fluorine atoms.

8. The polymer film according to claim 1 wherein the composition comprises (d) a radical initiator.

9. The polymer film according to claim 1 which is a cation exchange membrane.

10. A bipolar membrane comprising the polymer film according to claim 1.

11. The polymer film according to claim 1 which further comprises a porous support.

12. The polymer film according to claim 8 wherein component (d) is present in an amount of 0.001 to 10 wt % of component (d).

13. A method comprising placing the polymer film of claim 9 within a compartment, applying a current density over the polymer film and pumping a solution through the compartment.

14. A method comprising placing the bipolar membrane according to claim 10 within a compartment, applying a current density over the bipolar membrane and pumping a solution through the compartment.

15. The bipolar membrane according to claim 10 further comprising an anion exchange layer (AEL) obtained by curing a composition comprising a compound of Formula (IV):

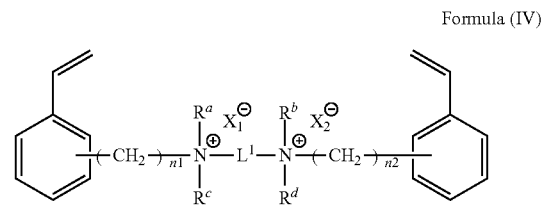

Formula (IV)

wherein:
   $L^1$ is an alkylene group or an alkenylene group;
   $R^a$, $R^b$, $R^c$ and $R^d$ are each independently an alkyl group or an aryl group, or
   $R^a$ and $R^b$, and/or Re and $R^d$, together with the atoms to which they are attached, form a ring;
   n1 and n2 each independently represent an integer having a value of 1 to 10; and
   $X_1^-$ and $X_2^-$ each independently represent an anion.

16. The polymer film according to claim 1 wherein:
   (i) component (a) is free from fluorine atoms;
   (ii) in component (a) R is methyl, phenyl, benzyl or $NH_2$;
   (iii) in component (b) the anionic group comprises a sulpho group or a bissulphonylimide group; and
   (iv) in component (b) the polymerisable groups are each independently selected from (meth) acrylic groups and vinyl groups.

17. The bipolar membrane according to claim 10 wherein:
(i) component (a) is free from fluorine atoms;
(ii) in component (a) R is methyl, phenyl, benzyl or $NH_2$;
(iii) in component (b) the anionic group comprises a sulpho group or a bissulphonylimide group; and
(iv) in component (b) the polymerisable groups are each independently selected from (meth) acrylic groups and vinyl groups.

* * * * *